United States Patent
Guetta et al.

(10) Patent No.: US 7,884,741 B2
(45) Date of Patent: Feb. 8, 2011

(54) FOR EXTERNALLY CLOCKED DIGITAL AUDIO INPUT, DETERMINING A VALID CLOCK AND MUTING AUDIO DURING SYNCHRONIZATION

(75) Inventors: Anthony Guetta, Palo Alto, CA (US); Raymond Montagne, Cupertino, CA (US); Matthew Xavier Mora, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/772,907

(22) Filed: May 3, 2010

(65) Prior Publication Data

US 2010/0277204 A1     Nov. 4, 2010

Related U.S. Application Data

(63) Continuation of application No. 11/551,010, filed on Oct. 19, 2006, now Pat. No. 7,710,294.

(51) Int. Cl.
*H03M 7/00* (2006.01)
(52) U.S. Cl. ............................ 341/50; 341/51; 341/144
(58) Field of Classification Search .................... 341/50, 341/51, 144
See application file for complete search history.

(56) References Cited

U.S. PATENT DOCUMENTS

| | | | |
|---|---|---|---|
| 4,232,393 A | 11/1980 | Kumaoka | |
| 5,245,667 A | 9/1993 | Lew | |
| 5,266,908 A | 11/1993 | Koulopoulos et al. | |
| 5,473,615 A | 12/1995 | Boyer et al. | |
| 5,970,399 A * | 10/1999 | Rostamy et al. | 455/222 |
| 6,006,108 A * | 12/1999 | Black et al. | 455/553.1 |
| 7,155,289 B1 | 12/2006 | Hartley | |
| 2006/0095623 A1 | 5/2006 | Nio | |
| 2007/0146550 A1 | 6/2007 | Ikuma | |

\* cited by examiner

*Primary Examiner*—Jean B Jeanglaude
(74) *Attorney, Agent, or Firm*—Gazdzinski & Associates, PC

(57) ABSTRACT

Methods and apparatus for determining the existence of an external clock over a digital input port on a computer. In one embodiment, the external clock is validated, and a lock is performed when the clock is valid. Whenever a loss of the lock is detected, and, if a re-lock is likely, the apparatus is muted so that audio artifacts that would otherwise be heard are minimized. The methods and apparatus also provide automatic re-locking to the external clock when a sampling rate change is detected.

22 Claims, 3 Drawing Sheets

FOR EXTERNALLY CLOCKED DIGITAL AUDIO INPUT, DETERMINING A VALID CLOCK AND MUTING AUDIO DURING SYNCHRONIZATION

PRIORITY AND CROSS-REFERENCE TO RELATED APPLICATIONS

This application is a continuation of and claims priority to co-owned U.S. patent application Ser. No. 11/551,010, of the same title, filed Oct. 19, 2006 now U.S. Pat. No. 7,710,294, which is incorporated herein by reference in its entirety.

FIELD

The present invention relates broadly to digital input in a computer device. Specifically, the present invention relates to clock synchronization in a device that supports digital audio input.

BACKGROUND

I2S, or Inter-IC Sound, or Integrated Interchip Sound, is an electrical serial bus interface standard used for connecting digital audio devices together. It is most commonly used to carry PCM information between the CD transport and the DAC in a CD player. The I2S bus separates clock and data signals, resulting in a very low jitter connection. Jitter can cause distortion in a digital-to-analog converter. The bus consists of at least three lines: a bit clock line, a word clock line (also called word select line) and at least one multiplexed data line.

Computers such as notebooks and other portable devices are gaining popularity among users for sound recording and playback, making I2S more popular among such devices. On some machines that support sound recording in the form of digital input, the digital input has been run off either a clock internal to the device, or off of the a clock derived from the external digital input signal itself. However, on these machines, there are often limitations of running off of an external clock only because the internal clock has been taken away and used for another requirement in the device.

This creates the problem of dynamically determining the existence of a valid external clock, and whether or not the digital input hardware 011 the device can use the external clock. While hardware solutions for this problem can be implemented, such implementations add complexity and cost to devices and are less desirable than a software implementation.

SUMMARY

The present invention satisfies the foregoing needs by, inter alia, dynamically determining the existence of an external clock.

In accordance with a first aspect of the invention, a method for determining a change in clocking within an externally clocked digital data stream is disclosed. In one embodiment, the method comprises reading a first clock parameter from the externally clocked digital data stream; comparing the first clock parameter to a stored clock parameter to generate a compared clock parameter; determining that the clocking has not changed if the compared clock parameter is less than a given tolerance value; and determining that the clocking has changed if the compared clock parameter is greater than the given tolerance value.

In a variant, the externally clocked digital data stream comprises an audio stream.

In another variant, the method further comprises muting the audio if the compared first clock parameter is greater than the given tolerance value.

In yet another variant, the method further comprises ceasing the muting of audio at a later time. In one variant, the act of ceasing the muting is performed upon completion of a number polling iterations. In an alternative variant, the act of ceasing the muting is performed upon expiration of a timer.

In yet another variant, the reading of the first clock parameter is performed via periodic polling of a hardware interface.

In yet another variant, the hardware interface is in communication with an audio driver.

In yet another variant, as a result of determining that the clocking has not changed, the method further comprises sending a clock lock indication to the audio driver.

In yet another variant, as a result of determining that the clocking has changed, the method further comprises sending a clock relock indication to the audio driver.

In yet another variant, the act of determining a change in clocking within an externally clocked digital data stream comprises determining a change in clock rate within the data stream.

In yet another variant, the first clock parameter and the stored clock parameter each comprise a clock ratio that ratios an output master clock with a recovered master clock.

In a second aspect of the invention, a computer readable apparatus having a storage medium with at least one computer program stored thereon for determining a change in clocking within an externally clocked digital data stream is disclosed. In one embodiment, the at least one computer program includes a plurality of computer executable instructions that when executed by a processor: read a first clock parameter from the externally clocked digital data stream; compare the first clock parameter to a stored clock parameter to generate a compared clock parameter; determine that a clocking has not changed if the compared clock parameter meets a tolerance requirement; and determine that the clocking has changed if the compared clock parameter does not meet the tolerance requirement.

In a variant, the at least one computer program further comprises one or more computer executable instructions that when executed by a processor subsequent to determining that the clocking has not changed sends a clock lock indication to a driver.

In yet another variant, the at least one computer program further comprises one or more computer executable instructions that when executed by a processor subsequent to determining that the clocking has changed sends a clock relock indication to a driver.

In a third aspect of the invention, apparatus configured to determine a change in clocking within an externally clocked digital data stream is disclosed. In one embodiment, the apparatus includes a first module to read a first clock parameter from the externally clocked digital data stream; a second module to compare the first clock parameter with a second clock parameter obtained at another time to generate a compared clock parameter; and a third module to: determine whether the compared clock parameter is within a prescribed range; lock the clock when within the prescribed range; and post a relock message when outside the prescribed range.

In a second embodiment, the apparatus further comprises a fourth module to temporarily suspend the decoding of the externally clocked digital data stream when outside the prescribed range. In a variant, the apparatus further comprises a fifth module to resume the decoding of the externally clocked digital data stream at a time subsequent to the fourth module temporarily suspending the decoding of the externally clocked digital data stream. In one alternative, the resumption of decoding is performed upon completion of a number polling iterations. In another alternative, the resumption of decoding is performed upon expiration of a timer.

In another variant, the apparatus further comprises an audio driver. In yet another variant, the locking of the clock comprises sending a clock lock indication to the audio driver. In yet another variant, the act of posting a relock message comprises sending a clock relock indication to the audio driver.

BRIEF DESCRIPTION OF THE DRAWINGS

Many other features and advantages of the present invention will be realized upon reading the following detailed description, when considered in conjunction with the accompanying drawings, in which.

DETAILED DESCRIPTION

Figure 1:
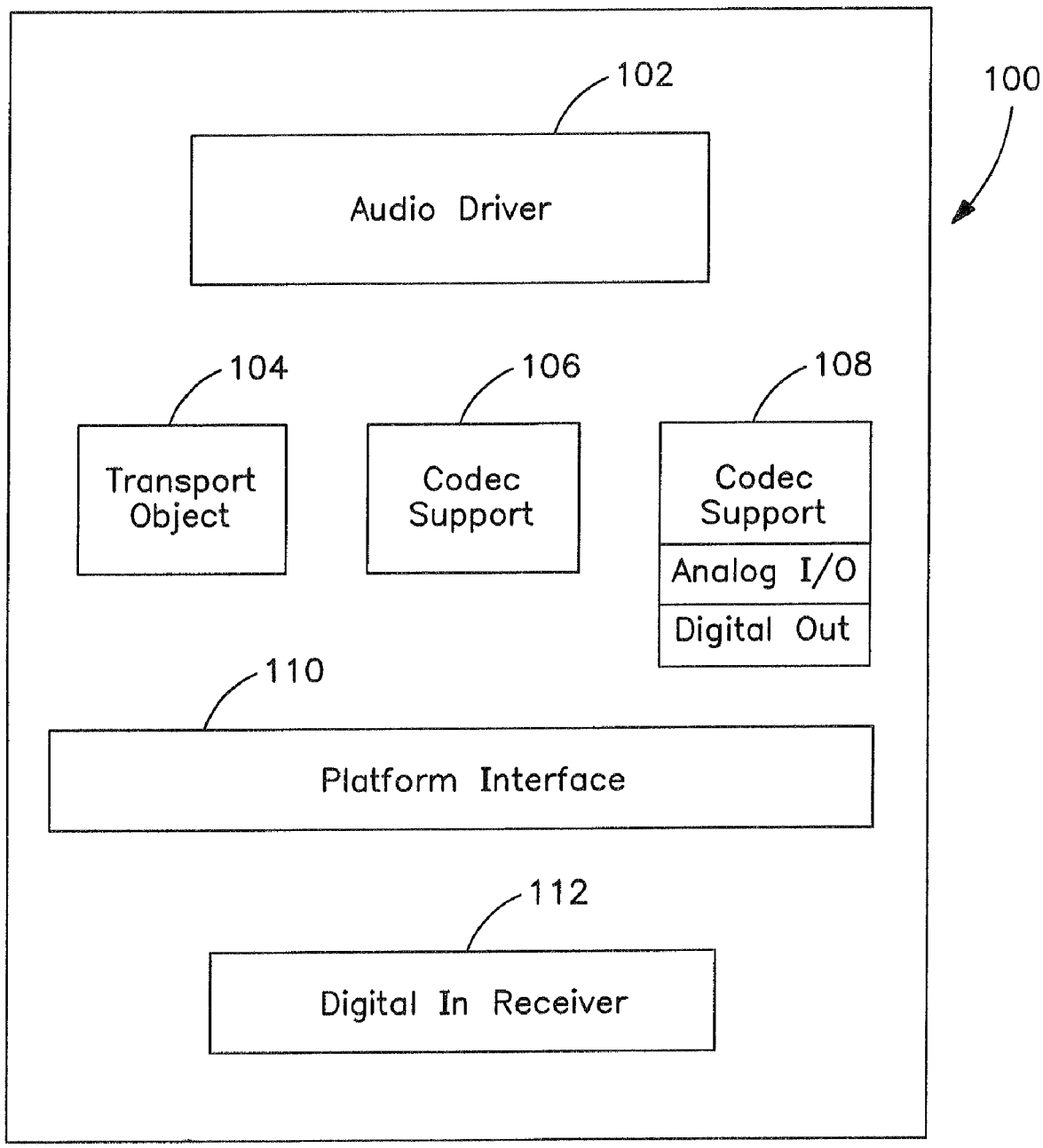
FIG. 1 illustrates the architecture of an embodiment of the present invention.

FIG. 1 illustrates an exemplary architecture of system 100 in accordance with the present invention. Directing attention to FIG. 1, system 100 includes audio driver 102 that has a polling mechanism and timer capabilities to communicate messages related to clock lock/unlock conditions. Audio driver 102 also controls transport object 104 and codec support module 106 as well as codec support module 108. Codec support module also handles analog input and output as well as digital output for system 100. Transport object 104, codec support module 106 and codec support module 108 are in communication with platform interface 110, which coordinates communication between the software components of system 100 and the hardware components of system 100.

On the hardware side of system 100, digital input receiver 112 contains a register that holds the ratio of the output master clock (OMCK) to the recovered master clock (RMCK). When this ratio value is within an acceptable range, it is possible that a valid external clock signal is present. The stability of this clock ratio value is measured. When system 100 first starts, or after it wakes from sleep, the OMCK/RMCK clock ratio is cached as an anchor measurement. Periodically, for example once per second, the current clock ratio is read. If the difference between the current ratio and the cached ratio is within a certain threshold, for example a variation of one bit, it is assumed that there exists a valid clock and the system 100 locks to it. However, if a step is detected in the ratio value, it is assumed that an unlock condition has occurred. At the end of each ratio step test, the current ratio is written to the cached ratio value. Thus, the rate of change of the clock ratio is approximated over time.

If a ratio step is detected, and one of the step endpoints corresponds to a valid ratio, this may indicate a change in the input signal sampling rate. In this case, it is assumed that a re-lock is pending, and system 100 is muted until a relock occurs. Muting system 100 minimizes audible artifacts. If the re-lock does not occur within a threshold number of poll cycles, such as three polling cycles, it is assumed that a re-lock is not likely to occur and the mute placed on system 100 is withdrawn.

Figure 2:
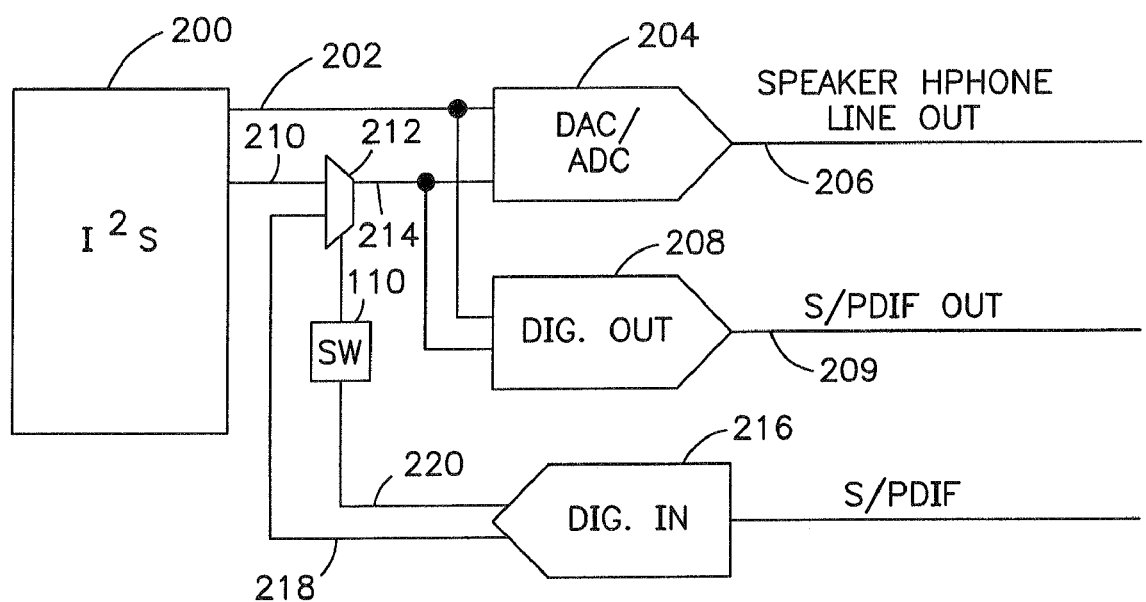
FIG. 2 illustrates hardware utilized in an embodiment of the present invention.

Directing attention to FIG. 2, system 100 is shown having an I2S processor 200 with two lines out is shown. Line 202 connects to digital to analog and/or analog to digital converter 204, to which line out 206 is connected. Line 202 also connects to digital out module 208, to which S/PDIF line out 209 is connected. Line 210 passes to multiplexer 212, which in turn is connected via line 214 to converter 204 as well as digital out module 208. Digital in module 216, containing digital input receiver module 112, has a first line 218 and a second line 220, both connecting to multiplexer 212.

Figure 3:
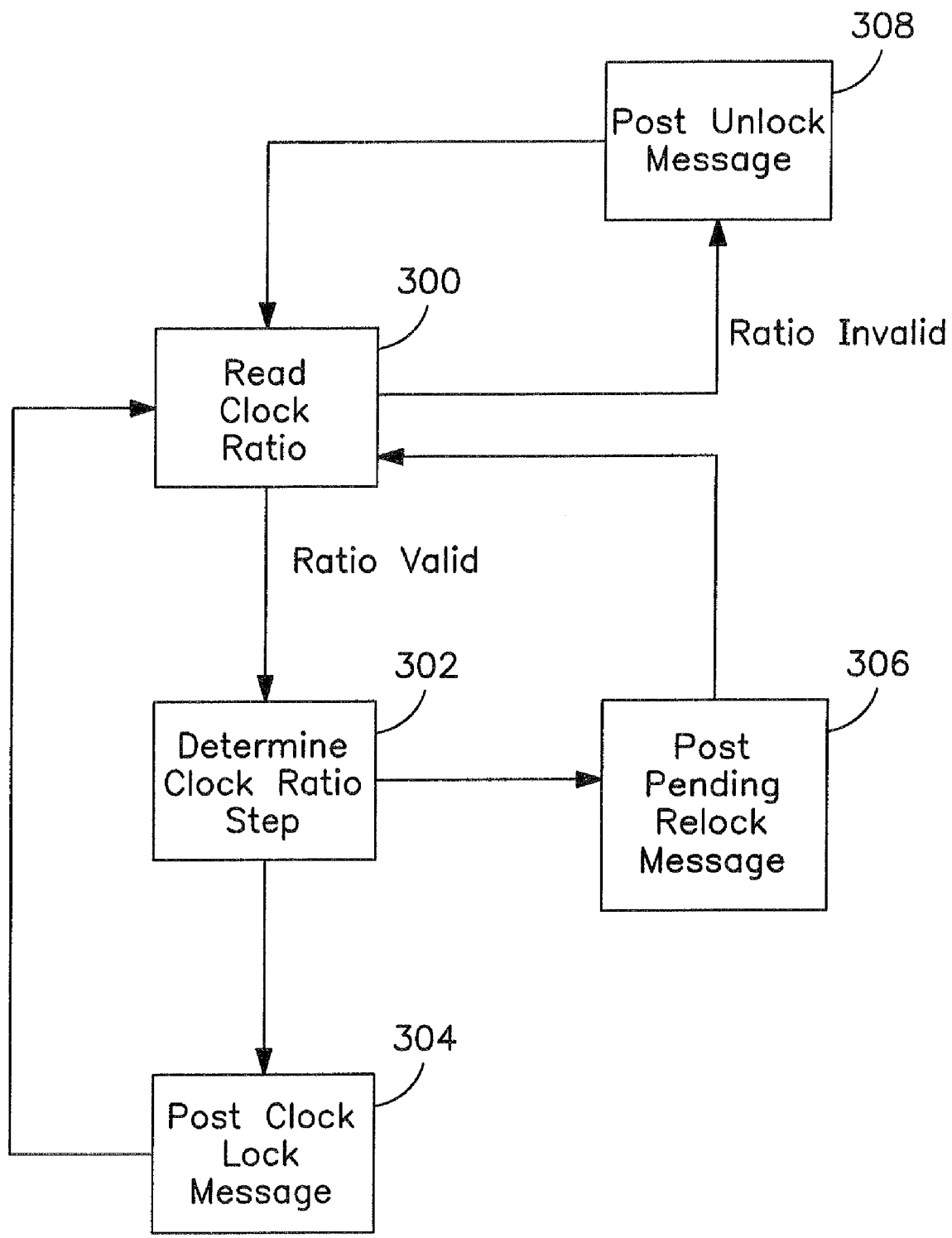
FIG. 3 illustrates a sequence of steps executed in accordance with the present invention.

Directing attention to FIG. 3, a sequence of steps in accordance with the present invention is shown. After an anchor clock ratio reading is performed as described above, control begins at step 300, in which the clock ratio is read. If the clock ratio is considered valid, control transitions to step 302, where a determination is made as to whether or not a clock ratio step has occurred. If the clock ratio step is within an acceptable variation, control transitions to step 304, where audio driver 102 posts a clock lock message is to platform interface 110. An example of one valid ratio value jumping to another valid ratio value is where the external sampling rate in the digital in stream has changed. As long as one of the endpoint values is valid when the step occurs, it is assumed by system 100 that a re-lock is pending and system 100 remains muted. The current clock ratio is then cached for determining the next occurrence of a ratio step. Control transistions from step 304 back to step 300, where the next clock ratio is read. Returning to step 302, if it is determined that the clock ratio step is outside of a tolerance level, control transitions to step 306, where system 100 is muted to prevent audio artifacts from being heard, and a pending relock message is posted. Control transitions from step 306 back to step 300, where the next clock ratio is read. Returning to step 300, if the clock ratio is determined to be invalid, control transitions to step 308, where an unlock message is posted. Control transitions from step 308 back to step 300, where the next clock ratio is read.

As described above, system 100 obtains the clock ratio by polling periodically. When a re-lock message is posted, for example after step 306, polling may be limited by a threshold number or a timer to determine whether or not the re-lock is imminent, and, if not, system 100 is unmuted.

While a method and apparatus for determining the presence of a valid clock within an externally clocked digital audio input has been illustrated and described in detail, it is to be understood that many changes and modifications can be made to various embodiments of the present invention without departing from the spirit thereof.

What is claimed is:

1. An apparatus configured to determine a change in clocking within an externally clocked digital data stream, the apparatus comprising:
    a first module to read a first clock parameter from the externally clocked digital data stream;
    a second module to compare the first clock parameter with a second clock parameter obtained at another time to generate a compared clock parameter; and
    a third module to:
        determine whether the compared clock parameter is within a prescribed range;
        lock the clock when within the prescribed range; and
        post a relock message when outside the prescribed range.

2. The apparatus of claim 1 further comprising a fourth module to temporarily suspend the decoding of the externally clocked digital data stream when outside the prescribed range.

3. The apparatus of claim 2, further comprising a fifth module to resume the decoding of the externally clocked digital data stream at a time subsequent to the fourth module temporarily suspending the decoding of the externally clocked digital data stream.

4. The apparatus of claim 3, wherein the resumption of decoding is performed upon completion of a number polling iterations.

5. The apparatus of claim 3, wherein the resumption of decoding is performed upon expiration of a timer.

6. The apparatus of claim 1, further comprising an audio driver, and wherein the locking of the clock comprises sending a clock lock indication to the audio driver.

7. The apparatus of claim 1, further comprising an audio driver, and wherein posting a relock message comprises sending a clock relock indication to the audio driver.

8. A computer readable apparatus having a storage medium with at least one computer program stored thereon for determining a change in clocking within an externally clocked digital data stream, the at least one computer program comprising a plurality of computer executable instructions that when executed by a processor:
   read a first clock parameter from the externally clocked digital data stream;
   compare the first clock parameter to a stored clock parameter to generate a compared clock parameter;
   determine that the clocking has not changed if the compared clock parameter meets a tolerance requirement; and
   determine that the clocking has changed if the compared clock parameter does not meet the tolerance requirement.

9. The computer readable apparatus of claim 8, wherein the at least one computer program further comprises one or more computer executable instructions that, when executed by a processor subsequent to determining that the clocking has not changed, send a clock lock indication to a driver.

10. The computer readable apparatus of claim 8, wherein the at least one computer program further comprises one or more computer executable instructions that, when executed by a processor subsequent to determining that the clocking has changed, send a clock relock indication to a driver.

11. A method for determining a change in clocking within an externally clocked digital data stream, the method comprising:
   reading a first clock parameter from the externally clocked digital data stream;
   comparing the first clock parameter to a stored clock parameter to generate a compared clock parameter;
   determining that the clocking has not changed if the compared clock parameter is less than a given tolerance value; and
   determining that the clocking has changed if the compared clock parameter is greater than the given tolerance value.

12. The method of claim 11, wherein the externally clocked digital data stream comprises an audio stream.

13. The method of claim 12, further comprising muting the audio if the compared first clock parameter is greater than the given tolerance value.

14. The method of claim 13, further comprising ceasing the muting of audio at a later time.

15. The method of claim 14, wherein ceasing the muting is performed upon completion of a number polling iterations.

16. The method of claim 14, wherein ceasing the muting is performed upon expiration of a timer.

17. The method of claim 11, wherein reading the first clock parameter is performed via periodic polling of a hardware interface.

18. The method of claim 17 wherein the hardware interface is in communication with an audio driver.

19. The method of claim 18, wherein as a result of determining that the clocking has not changed, the method further comprises sending a clock lock indication to the audio driver.

20. The method of claim 18, wherein as a result of determining that the clocking has changed, the method further comprises sending a clock relock indication to the audio driver.

21. The method of claim 11, wherein the determining a change in clocking within an externally clocked digital data stream comprises determining a change in clock rate within the data stream.

22. The method of claim 21, wherein the first clock parameter and the stored clock parameter each comprise a clock ratio that ratios an output master clock with a recovered master clock.

* * * * *

UNITED STATES PATENT AND TRADEMARK OFFICE
CERTIFICATE OF CORRECTION

| | | |
|---|---|---|
| PATENT NO. | : 7,884,741 B2 | Page 1 of 1 |
| APPLICATION NO. | : 12/772907 | |
| DATED | : February 8, 2011 | |
| INVENTOR(S) | : Anthony Guetta et al. | |

It is certified that error appears in the above-identified patent and that said Letters Patent is hereby corrected as shown below:

In column 1, line 45, delete "011" and insert -- on --, therefor.

In column 4, line 26, delete "transistions" and insert -- transitions --, therefor.

Signed and Sealed this
Eighth Day of November, 2011

David J. Kappos
*Director of the United States Patent and Trademark Office*